United States Patent [19]

Takahashi et al.

[11] Patent Number: 4,891,267
[45] Date of Patent: Jan. 2, 1990

[54] CARBON FIBER CORD FOR RUBBER REINFORCEMENT AND PROCESS FOR PRODUCING THE SAME

[75] Inventors: Shuji Takahashi; Yasuo Suzuki, both of Kanagawa; Hiroyasu Ogawa; Kazuhiro Ichimaru, both of Shizuoka, all of Japan

[73] Assignees: Toho Rayon Co., Ltd.; The Yokohama Rubber Co., Ltd., both of Tokyo, Japan

[21] Appl. No.: 942,335

[22] Filed: Dec. 16, 1986

[30] Foreign Application Priority Data

| Dec. 16, 1985 | [JP] | Japan | 61-280984 |
| Dec. 16, 1985 | [JP] | Japan | 61-280985 |
| Dec. 24, 1985 | [JP] | Japan | 61-289305 |
| Dec. 24, 1985 | [JP] | Japan | 61-289307 |
| Dec. 24, 1985 | [JP] | Japan | 61-289308 |

[51] Int. Cl.⁴ .......................... B32B 9/00; D02G 3/00
[52] U.S. Cl. ................................. 428/367; 428/375; 428/378
[58] Field of Search ............. 428/367, 375, 392, 364, 428/408, 378; 57/238, 250, 244, 243, 528, 902; 525/438, 448, 113, 122

[56] References Cited

U.S. PATENT DOCUMENTS

| 3,806,489 | 4/1974 | Rleux et al. | 260/38 |
| 4,167,538 | 9/1979 | Taniguchi et al. | 428/375 |
| 4,420,512 | 12/1983 | Ogawa et al. | 427/386 |

FOREIGN PATENT DOCUMENTS

| 020193 | 4/1974 | France . | |
| 006998 | 3/1975 | Japan . | |
| 105009 | 5/1975 | Japan . | |
| 090431 | 2/1977 | Japan . | |
| 56181 | 5/1977 | Japan . | 428/368 |
| 139612 | 4/1982 | Japan . | |
| 166128 | 6/1982 | Japan . | |
| 47051 | 3/1983 | Japan . | 525/122 |
| 044481 | 9/1983 | Japan . | |
| 21787 | 2/1984 | Japan . | 428/374 |
| 127559 | 2/1984 | Japan . | |
| 021207 | 8/1985 | Japan . | |
| 035887 | 9/1985 | Japan . | |
| 044743 | 9/1986 | Japan . | |
| 053323 | 9/1986 | Japan . | |
| 144309 | 1/1987 | Japan . | |

OTHER PUBLICATIONS

Toki, M., et al, Chemical Abstract 87:153214u (Jap. Patent 77-56181).
Toki, M., et al, Chemical Abstract 83:207381j (Jap. Patent 75-102678).
Toki, M., et al, Chemical Abstract 83:207382k (Jap. Patent 75-102679).

Primary Examiner—Lorraine T. Kendell
Attorney, Agent, or Firm—Armstrong, Nikaido, Marmelstein, Kubovcik & Murray

[57] ABSTRACT

A carbon fiber cord for rubber reinforcement, comprising (A) a carbon fiber bundle comprising carbon fibers selected from the group consisting of carbon fibers having coated thereon from 0.1 to 1% by weight of at least one epoxy resin composition and carbon fibers having coated thereon from 0.5 to 15% by weight of a metal selected from the group consisting of copper, nickel, zinc, and cobalt, and (B) a phenol-formalin-rubber latex type adhesive for rubber impregnated to said carbon fiber bundle in an amount of from 10 to 30% by weight, and said epoxy resin is selected from the group consisting of (1) a composition comprising an epoxy resin and from 5 to 20% by weight of a compound represented by formula (I)

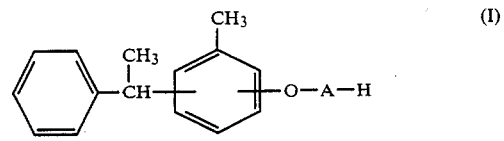

wherein A represents $-(C_2H_4O)_l-$ or $-(C_2H_4O)_n(C_3H_6O)_m-$, wherein $l$ and $n$ each represents an integrer of from 18 to 50, m represents an integer of from 1 to 50, and $n/m$ is from 1 to 25, (Abstract continued on next page.)

(2) a composition comprising a urethane-modified epoxy resin represented by formula

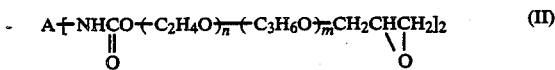 (II)

wherein A represents an aliphatic or aromatic hydrocarbon group, m and n each represents 0 or an interger of 1 or more, and the sum of n and m is from 2 to 10, and
(3) a composition comprising polybutadiene epoxide resin containing a glycidyl group and having an epoxy equivalent of from 1,000 to 2,000, which is represented by formula (III)

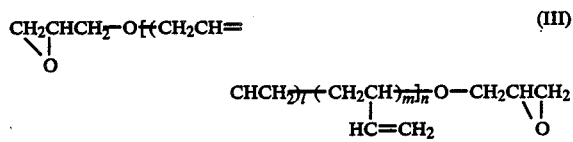 (III)

wherein n represents an integer of from 4 to 22, and 1/m is from 2.3 to 9.

18 Claims, 2 Drawing Sheets

CARBON FIBER CORD FOR RUBBER REINFORCEMENT AND PROCESS FOR PRODUCING THE SAME

FIELD OF THE INVENTION

This invention relates to a carbon fiber cord for rubber reinforcement which exhibits excellent adhesion to rubber.

BACKGROUND OF THE INVENTION

Cord fibers to be used in conventional rubber reinforcing cords for use in tires, belts, etc., include rayon, polyamides, polyesters, and the like. Recently, organic fibers such as aramide (aromatic polyamide fibers), and inorganic fibers, such as glass fiber, steel fiber, etc., have also been employed as cord fibers. In particular for use in tires, it is desirable that the rubber reinforcing cords comprise fibrous materials having high strength, high modulus, and lightweight, from the standpoint of controllability when driving, running stability, comfortability to ride on, durability of tires, fuel cost, and the like.

Carbon fibers are a highly promising material for producing excellent rubber reinforcing cords because of their characteristics of much higher specific modulus and specific strength as compared with the aforesaid reinforcing fibers. However, carbon fibers have a disadvantage of poor adhesion to rubber, and many attempts have been made to overcome this disadvantage. For example, there have been proposed a process for producing a reinforcing cord which comprises twisting elastomer-impregnated carbon fibers as disclosed in U.S. Pat. No. 3,648,452; a process which comprises treating carbon fibers with an epoxy compound and then with an adhesive for a rubber, such as a resorcin-formalin-rubber latex type adhesive (hereinafter referred to as RFL) as disclosed in Japanese Patent Application (OPI) No. 102678/75 (the term "OPI" as used herein means "unexamined published application"); a process which comprises treating carbon fibers with a first processing bath containing a polyisocyanate and then with a second processing bath containing RFL as disclosed in Japanese Patent Application (OPI) No. 102679/75; and the like.

None of these proposals, however, has been able to attain adhesion to rubber completely sufficient for practical use. Additionally, these conventional processes could not succeed in solving another problem associated with carbon fibers arising from their high modulus of elasticity, i.e., extremely poor resistance to repeated flexing fatigue, such as elongation, compression, and the like.

According to the inventors' studies, the causes of the insufficient performances of the above-described carbon fiber cords are considered to reside in that the elastomer, epoxy resin or polyisocyanate present between carbon fibers and rubber or between carbon fibers and RFL is not bound to the carbon fibers or, if they are bound to the carbon fibers, they do not allow penetration of rubber or RFL into spaces between filaments constituting a carbon fiber bundle, resulting in insufficient adhesion within the carbon fiber bundle.

In order to assist in penetration of RFL into the carbon fiber bundle, use of a water-soluble epoxy resin has been proposed. According to this process, however, since RFL is applied as a water dispersion, the water-soluble epoxy resin not only falls off by dissolving during treatment to reduce the effects, but also contaminates the RFL dispersion.

SUMMARY OF THE INVENTION

One object of this invention is to provide a carbon fiber cord for rubber reinforcement, in which an adhesive is sufficiently penetrated into spaces between filaments constituting a carbon fiber bundle, thus exhibiting excellent adhesion to rubber and resistance to repeated fatigue, particularly to flexing fatigue.

It has now been found that the above object can be accomplished by a carbon fiber cord for rubber reinforcement, which comprises (A) a carbon fiber bundle comprising carbon fibers selected from the group consisting of carbon fibers having coated thereon from 0.1 to 1% by weight (solids content) based on the weight of the carbon fibers thus treated of at least one epoxy resin composition and carbon fibers having coated thereon from 0.5 to 15% by weight based on the weight of the carbon fiber thus treated of a metal selected from the group consisting of copper, nickel, zinc, and cobalt, and (B) a phenol-formalin rubber latex type adhesive for rubber impregnated to said carbon fiber bundle in an amount of from 10 to 30% by weight (dry weight) based on weight of the carbon fiber bundle thus treated, and said epoxy resin is selected from the group consisting of (1) a composition comprising an epoxy resin and from 5 to 20% by weight, based on the weight of the solid components in the composition, of a compound represented by formula (I)

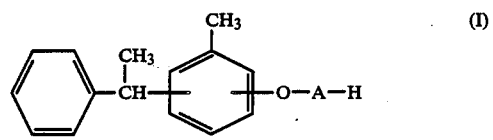

wherein A represents $-(C_2H_4O)_l-$ or $-(C_2H_4O)_n-(C_3H_6O)_m-$, wherein l and n each represents an integer of from 18 to 50, m represents an integer of from 1 to 50, and n/m is from 1 to 25 (i.e., from 1/1 to 25/1), (2) a composition comprising a urethane-modified epoxy resin represented by formula (II):

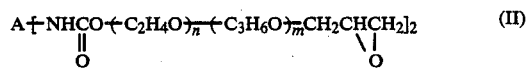

wherein A represents an aliphatic or aromatic hydrocarbon group, m and n each represents 0 or an integer of 1 or more, and the sum of n and m is from 2 to 10, and (3) a composition comprising polybutadiene epoxide resin containing a glycidyl group and having an epoxy equivalent of from 1,000 to 2,000, which is represented by formula (III)

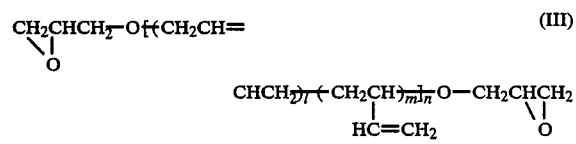

wherein n represents an integer of from 4 to 22, and l/m is from 2.3 to 9.

BRIEF DESCRIPTION OF ACCOMPANYING DRAWINGS

DETAILED DESCRIPTION OF THE INVENTION

Figure 1:
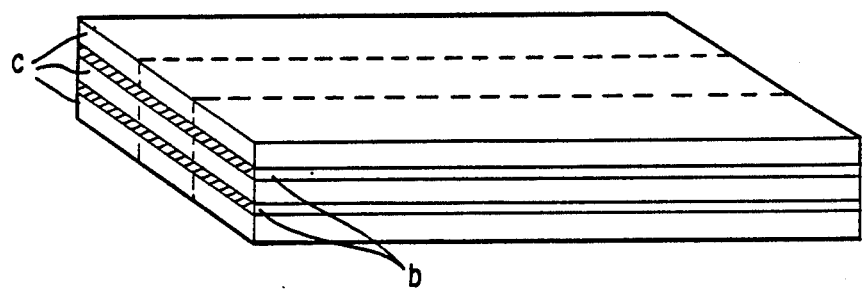
FIG. 1 illustrates a two-ply structure comprising rubber and the carbon fiber cord of the invention which is used in a two-ply peel test.

The carbon fibers which can be used in the present invention include both carbon fibers having a high carbon content and carbonaceous fibers having a relatively low carbon content. Usually, such carbon fibers have a carbon content of at least 70% by weight.

The carbon fiber bundle which can be used in the present invention can be prepared by known processes, such as the process disclosed in U.S. Pat. No. 4,069,297. For example, the carbon fiber bundle can be prepared by oxidizing known polymer fibers comprising mainly acrylonitrile (acrylic fiber) in an oxidizing atmosphere, e.g., air, at a temperature of from 200° to 300° C. for a period of from 0.1 to 100 minutes, and then carbonizing the oxidized fibers in an inert gas atmosphere, e.g., $N_2$, argon or helium at a temperature of from 600° to 3,000° C.

The carbon fiber bundle may also be prepared by forming fibers from a pitch of petroleum or coal, rendering the fibers infusible, and carbonizing the infusible fibers in an inert gas atmosphere, e.g., nitrogen, argon, helium, etc , at a temperature of from 600° to 3,000° C.

The bundle to be used usually comprises from 100 to 100,000 filaments each having a cross section area of from $2 \times 10^{-4}$ to $5 \times 10^{-6}$ mm$^2$. The carbon fiber bundle preferably has a specific resistivity of from $10^3$ to $10^{-4}$ $\Omega$cm, a tensile strength of not less than 100 kgf/mm$^2$, a modulus of elasticity of not less than $10 \times 10^3$ kgf/mm$^2$, bonded oxygen, which is determined by the following equation, of at least 1 wt %, and tensile ductility of at least 1.7.

$$\frac{\left(\begin{array}{c}\text{Total weight}\\\text{of sample}\end{array}\right) - \left(\begin{array}{c}\text{Weight}\\\text{of ash}\end{array}\right) - \left(\begin{array}{c}\text{Total weight}\\\text{of C, H, N}\end{array}\right)}{\left(\begin{array}{c}\text{Total weight}\\\text{of sample}\end{array}\right) - \left(\begin{array}{c}\text{Weight}\\\text{of ash}\end{array}\right)} \times 100 \, (\%)$$

(The weight of ash is obtained by heating the sample in air at a temperature of 600° C. for 24 hours.)

The compound represented by formula (I) which is used in the composition (1) of the invention is prepared from styrene, methylphenol, and ethylene oxide or ethylene oxide with propylene oxide. The number of the alkylene oxide moieties and the amount of the compound (I) to be used are keys to penetration into a carbon fiber bundle. In particular, the number of moles of the alkylene oxide(s) added should be optimized depending on the kind of the epoxy resin it is to be combined with. When the moiety A in formula (I) is derived solely from an ethylene oxide compound, the number of moieties thereof ranges from 18 to 50. If it is less than 18, a sufficient coverage of the adhesive in the subsequent treatment with the adhesive cannot be assured, and also penetrability into the carbon fiber bundle is reduced. On the other hand, if it exceeds 50, the composition tends to fall off during the adhesive treatment to cause contamination of the adhesive bath. In cases where the moiety A is an ethylene oxide-propylene oxide block copolymer, the number of ethylene oxide moiety (n) ranges from 18 to 50; and that of propylene oxide (m) ranges from 2 to 50, with the ratio n/m being in the range of from 1 to 25. If the ratio n/m is less than 1, the adhesive coverage becomes insufficient, and penetrability into the carbon fiber bundle is reduced With ratios n/m exceeding 25, the composition tends to contaminate the adhesive bath.

The epoxy resin which is used in the composition (1) preferably has an epoxy equivalent (a ratio of a molecular weight to a number of epoxy group contained per molecule) of from 50 to 500 and contains at least one, and usually from 1 to 4, epoxy groups per molecule. Such epoxy resins include bisphenol resins, phenol novolak resins, polyphenol resins, nitrogen-containing epoxy resins (e.g , epoxy resins containing glycidylamine group(s)), etc. Of these, bisphenol resins, e.g., bisphenol A resin having an epoxy equivalent of from 150 to 450 is particularly preferred. Specific examples of these epoxy resins are described in U.S. Pat. No. 4,482,660.

The composition (1) comprising the above-described epoxy resin and the compound of formula (I) may further contain, if desired, other resins, such as rubber latices, in an amount of up to 20% (solids content) by weight based on the total weight of the solids content of the composition. It is advantageous to decrease the proportion of the rubber latex in the case of using a water-soluble or nearly water-soluble epoxy resin, and to increase the proportions in the case of using a hydrophobic epoxy resin from considerations of improvement on penetrability of the adhesive or prevention of contamination of the adhesive bath When the proportion of other resins is less than 5% by weight, improvement of penetrability of the adhesive into the carbon fiber bundle is not sufficient; and addition of more than 20% by weight causes falling off of the composition to contaminate the adhesive bath.

In the preparation of the coating liquid of the composition (1), prescribed amounts of the compound of formula (I), the epoxy resin, and other resins, if used, are mixed to form a liquid. In cases where both the compound of formula (I) and the epoxy resin are solid, or where either of them is liquid but the mixture is difficult to liquefy, the mixture may be heat-melted. The mixture is then dissolved in a solvent, such as acetone, methyl ethyl ketone, etc., or emulsified in water under vigorous stirring. In view of stability, it is preferable that the solution or emulsion has a solids content of from 30 to 50% by weight and is diluted with water so as to have a solid content of from 0.1 to 5% by weight upon use.

In the composition (2) of the invention, a urethane-modified epoxy resin represented by formula (II) is employed. In formula (II), the aliphatic or aromatic hydrocarbon group as represented by A includes an alkylene group, preferably having from 1 to 6 carbon atoms, an arylene group, preferably having from 6 to 12 carbon atoms, and an alkane diaryl group and aralkylene group having from 7 to 16 carbon atoms. The urethane-modified epoxy resin of formula (II) is prepared by addition reaction of ethylene oxide and/or propylene oxide to an aliphatic or aromatic urethane compound and reacting the resulting addition product with epichlorohydrin in the presence of a catalyst, e.g., sodium chloride.

When the alkylene oxide moiety in formula (II) solely comprises ethylene oxide (m=0) or propylene oxide (n=0), the number of the ethylene oxide or propylene oxide moieties (n or m) should range from 2 to 10 in order to ensure penetration of the adhesive into the carbon fiber bundle and to maintain softness of the resulting carbon fiber cord. Urethane-modified epoxy compound to which no ethylene oxide or propylene oxide is added is unfavorable due to lack of softness after coating of the adhesive. If n or m exceeds 10, the composition tends to fall off during the subsequent adhesive treatment to contaminate the adhesive bath. When ethylene oxide is not used (n=0), the contamination can be avoided. However, in order to obtain excellent penetrability, it is preferable that ethylene oxide is also used. On the other hand, when only ethylnene oxide is used (m=0), the penetration is excellent. However, in order to prevent contamination, it is preferable that propylene oxide is also used.

When the alkylene moiety of formula (II) is an ethylene oxide/propylene oxide block copolymer, the total number of moles of ethylene oxide and propylene oxide added should be such that n+m is within the range of from 2 to 10. If it is less than 2, the cord obtained after adhesive treatment lacks softness. If it exceeds 10, the finally obtained cord has reduced adhesion to rubber or reduced resistance to flexing fatigue. When n+m in the block copolymer is within the range of from 2 to 10, the penetration is excellent and contamination is highly prevented.

The urethane-modified epoxy resin of formula (II) preferably includes a reaction product between a polyisocyanate, e.g., 2,4-tolylene diisocyanate, m-phenylene diisocyanate, p-phenylene diisocyanate, diphenylene diisocyanate, hexamethylene diisocyanate, etc., or mixture of such a polyisocyanate with a polyoxyalkylene oxide and epichlorohydrin.

The epoxy resin composition of (2) preferably has a rate of falling-off of from 0.01 to 0.2% by weight as determined by the following method.

A sample of carbon fibers coated with the epoxy resin composition weighing one gram (wherein the coverage of the epoxy resin composition is within the range of the invention) is immersed in water at 40° C. for 30 minutes, dried at 120° C. for 30 minutes, and weighed. The rate of falling-off can be obtained from the equation $$\text{Rate of Falling-off (\%)} = \frac{\left(\text{Weight Before Immersion}\right) - \left(\text{Dry Weight After Immersion}\right)}{\text{(Weight Before Immersion)}} \times 100$$

The rate of falling-off is determined by selection of A, m, and n of the urethane-modified epoxy resin of formula (II). In general, the rate of falling-off shows a tendency to increase as the ratio of n becomes greater with the type of A being fixed. If the rate of falling-off is less than 0.01% by weight, penetrability of the adhesive is low. A rate of falling-off exceeding 0.2% by weight not only causes contamination of the adhesive bath but also sometimes gives rise to a problem of inferior adhesion to the adhesive and rubber.

If desired, the epoxy resin composition (2) may further contain other resins, such as those enumerated as examples of the epoxy resin used in the composition (1), polyester epoxy resins, rubber latices, etc. The proportion of these other resinous components is preferably up to 20% by weight (solids content) and preferably not less than 5% by weight based on the urethane-modified epoxy resin, in view of considerations of penetrability of the adhesive into the carbon fiber bundle. It is preferable for ensuring adhesion to adhesive that the composition further contains a polyoxyethylene hydrocarbon compound having an HLB (hydrophilic-lipophilic balance) of from 10 to 18 in an amount of up to 20% by weight based on the weight of the urethane-modified epoxy resin. Polyoxyethylene hydrocarbon compounds having an HLB of less than 10 tend to deteriorate penetrability of the adhesive to the bundle. If the HLB is higher than 18, the resulting composition too easily falls off during the adhesive treatment to contaminate the adhesive bath. When the amount of the polyoxyethylene hydrocarbon compound is less than 10% by weight, no appreciable improvement in penetrability of the adhesive is produced. On the other hand, if it is more than 20% by weight, adhesion to the adhesive and the carbon fibers is deteriorated. The polyoxyethylene hydrocarbon compounds having an HLB of from 10 to 18 which can be used in the composition (2) include polyethylene glycol (number of moles added: 20 to 40) alkyl phenyl ethers with the alkyl moiety preferably containing from 8 to 18 carbon atoms, and the compounds represented by formula (I), and preferably styrylmethylphenyl polyoxyethylene adducts of formula (I) wherein A is $(C_2H_4O)_l$ wherein l is as defined above.

The coating liquid of the composition (2) of the invention can be prepared by dissolving the urethane-modified epoxy resin in a solvent, such as acetone, methyl ethyl ketone, etc., or dispersing a mixture of the urethane-modified epoxy resin and the aforesaid compound having an HLB of from 10 to 18 in water to prepare an aqueous emulsion.

The epoxy resin represented by formula (III) which can be used in the composition (3) of the present invention has an epoxy equivalent of from 1,000 to 2,000. An epoxy equivalent of smaller than 1,000, though bringing about improved adhesion to carbon fibers, is not favorable since the cord obtained after application of the adhesive becomes hard. When it exceeds 2,000, adhesion to carbon fibers is poor.

From an economic standpoint, the composition (3) may further comprise, if desired, other unexpensive polybutadiene derivatives, such as compounds of formula (III) in which the terminal glycidyl ether group is substituted with a hydroxyl group or a carboxyl ether group ($OCH_2COOH$), with their molecular weights falling within the range defined by formula (III). The proportion of such a polybutadiene derivative in the composition (3) is preferably up to 30% by weight based on the weight of the epoxy resin of formula (III).

The epoxy resin composition (3) may furthermore contain, if desired, a catalyst for epoxy ring opening, such as dicyandiamide, imidazole catalysts, e.g., 2-ethyl-4-methylimidazole, etc., in an amount of from 0.1 to 5% by weight based on the epoxy resin of formula (III). By the action of this catalyst, the reaction between carbon fibers and the epoxy resin proceeds to thereby prevent entrance of other foreign materials between the fibers and the epoxy resin.

The coating liquid of the composition (3) can be prepared by dissolving the epoxy resin of formula (III), and, if desired, the above-described other epoxy resins and/or the catalyst in a solvent, such as ethyl acetate, methyl ethyl ketone, acetone, and the like. The composition (3) preferably contains the catalyst for the above-described reason.

The epoxy resin composition in accordance with the present invention is coated on a carbon fiber bundle to a dry coverage of from 0.1 to 1% (solids content) by weight based on the weight of the carbon fiber bundle thus treated. If the coverage is less than 0.1% by weight, the subsequent treatment with the adhesive results in uneven coating or reduction of coverage. If it exceeds 1% by weight, penetration of the adhesive into the inside of the carbon fiber bundle is inhibited. In view of penetrability of the adhesive and uniform adhesive coating, a particularly preferred coverage of the epoxy resin composition ranges from 0.2 to 0.5% by weight.

Application of the epoxy resin composition to the carbon fiber bundle can be carried out by any of known coating methods, such as roller coating, spray coating, dip coating, and the like. In the case of dip coating, the carbon fiber bundle is dipped in a bath having a solid concentration of from 0.1 to 30 g/liter usually at room temperature, that is, a temperature of from about 10° to about 30° C., followed by drying, usually at a temperature of from about 50° to about 120° C., for a period of from 0.5 to 3 minutes, to thereby remove any solvent or water content. In order to increase adhesion, it is preferable that the thus treated bundle is further heated at from 120 to 140° C. for from 1 to 10 minutes.

The resulting carbon fiber bundle having coated thereon the epoxy resin composition is then applied with the adhesive in an amount of at least 10% (dry weight) by weight based on the weight of the carbon fiber bundle thus treated, i.e., the total amount of the carbon fiber bundle, the epoxy resin composition coverage and the amount of the adhesive preferably not more than 30% by weight. It is more preferable that the amount is from 15 to 25% by weight. If the amount of the adhesive is less than 10% by weight, the resulting cord exhibits poor adhesion to rubber. If it exceeds 30% by weight, the resulting cord tends to become hard and tends to have a reduced flexing fatigue strength.

The phenol-formalin-rubber latex type adhesive used in the present invention is a conventionally used adhesive for adhering fibers with a rubber.

The phenol compound which is preferably used in the adhesive is a compound represented by the following formula (IV)

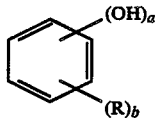

wherein a represents 1 or 2, R represents H or an alkyl group preferably having from 1 to 4 carbon atoms, and b represents 1 or 2.

Examples for the phenol include phenol, o-cresol, m-cresol, p-cresol, 3,5-xylenol, isothimol, thimol, catechol, and resorcin.

The adhesive is prepared by mixing a phenol compound with a formalin and allowing the mixture to react at room temperature (from about 20° to 30° C.) for from about 6 to 30 hours in the presence of a catalyst for a condensation reaction, such as alkaline catalyst or an acid catalyst to form a so-called primary condensation product which can be shown by formula (V)

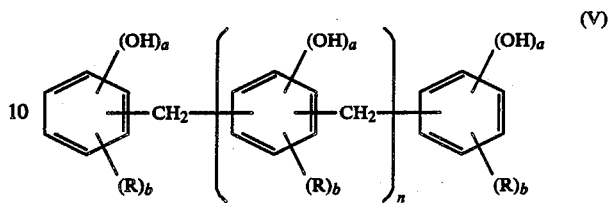

wherein a, b, and R each represents as defined above and n represents 0 or an integer of from 1 to 3, and then a rubber latex is added to the reaction mixture.

The molar ratio of the phenol compound and the formaldehyde is preferably from 1/0.1 to ⅓, and more preferably from 1/0.5 to 1/5. As the catalyst it is preferable to use an alkali such as sodium hydroxide or potassium hydroxide.

In the adhesive, a condensate represented by formula (VI) shown below may be used in place of a part of the amount of a phenol in order to improve adhesion to the rubber.

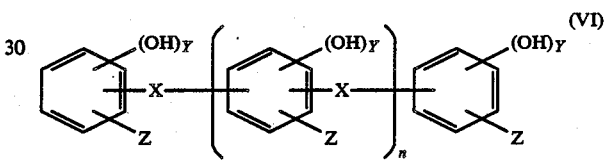

wherein X represents a methylene group, $-S_m-$ (wherein m is an integer of from 1 to 8), or an oxygen atom; Y represents 1 or 2; Z represents a hydrogen atom, a halogen atom, an alkyl group preferably having from 1 to 4 carbon atoms, an allyl group, an allyloxy group, or an alkoxy group preferably having from 1 to 4 carbon atoms; and n represents 0 or an integer of from 1 to 15.

The preferable amount of the condensate represented by formula (VI) is up to 70 weight % based on the total weight of the condensate and a phenol. In order to obtain the effect of improvement of adhesion, it is preferable that the amount is not less than 30 weight %.

A method for producing such a condensate is disclosed in Japanese Patent Application (OPI) No. 109684/83.

The rubber latex to be used in the adhesive includes a natural rubber latex, a styrene-butadiene copolymer latex, a vinylpyridine-styrene-butadiene terpolymer latex, a nitrile rubber latex, a chloroprene rubber latex etc., and a mixture thereof. Of these, a vinylpyridine-styrene-butadiene terpolymer latex (preferable molar ratio: 10-15/15-20/60-70) is particularly preferred.

In the preparation of the adhesive, the reaction mixture and the rubber latex are mixed at a weight ratio of from 1/1 to 1/15, and preferably from ⅓ to 1/12, on a solid basis, and the resulting mixture is dispersed in water so as to have solids content of from 10 to 35% by weight.

The thus prepared adhesive is preferably used within 100 hours, preferably 48 hours after mixing resorcin and formalin because the condensation reaction proceeds also after mixing the latex with the reaction mixture, and thereby the viscosity of the adhesive is gradually increases to make processability worse.

In carrying out the impregnation of the adhesive to the carbon fiber bundle having coated thereon the epoxy resin composition, the aqueous dispersion of the adhesive having the above-recited solid content, is applied thereto by, for example, dipping at room temperature (usually from 10° to 25° C.). If necessary, the amount to be applied can be adjusted by means of squeeze rollers. The thus treated carbon fiber bundle is then dried in hot air at a temperature of from 80° to 130° C., and preferably from 80° to 110° C., for a period of from 1 to 5 minutes, and preferably from 2 to 3 minutes, followed by heat-treatment at a temperature of from 180° to 250° C., and preferably from 200° to 230° C., for a period of from 0.5 to 5 minutes, and preferably from 1 to 2 minutes. This heat treatment reduces stickiness of the resulting fiber bundle to improve handling properties. In addition, if the heat treatment is not performed, when the carbon fiber cord is used as a reinforcing material for rubber, the water content remaining in the cord is vaporized upon heating to form voids in the rubber product, which results in reduction of adhesion between the cord and rubber. Heat treatment under conditions exceeding the above-recited upper limits of temperature and time is unfavorable because such heating induces further condensation of the above-described condensate per se and also partial reaction between the initial condensate and the latex to decrease functional groups necessary for the reaction with rubber.

It is preferable that the resulting fiber cord is again applied with the adhesion dispersion, followed by the same procedure as described above, such that the adhesive amount on the peripheral portion of the finally obtained cord occupies a proportion of from 10 to 30% by weight based on the total adhesive amount. Such a proportion of the peripheral adhesive amount can be calculated from the equation $$\text{Proportion of Peripheral Adhesive Content to Total Adhesive Content (\%)} = \frac{b}{a-c} \times 100$$

wherein a is a total area of a cross section of a carbon fiber cord having an adhesive adhered; b is an area of a cross section of a peripheral adhesive adhered; and c is a total area of a cross section of carbon fibers constituting a carbon fiber bundle. The area b can be determined from the thickness of the peripheral adhesive coating measured on an electron micrograph (10,000×magnification) of a cross section of a treated carbon fiber cord.

The adhesive which is applied additionally in the above-described second step may be the same as or different from that applied initially in the above-described first step. It is preferable that the adhesion which is applied in the second step is harder than that of the first step. For example, an adhesive obtained by using a mixture containing a phenol, for example resorcin and formaldehyde in a molar ratio of from 1/0.5 to 1/1 and further with the latex in a weight ratio of the phenol and formaldehyde to the latex of from 0.1/1 to 0.13/1 (which is comparatively soft) is used at the fist step, and that having the ratios of from 1/1.5 to ½ and 0.15 to 0.2, respectively (which is comparatively hard) is used at the second step.

In order to further improve adhesion to rubber, it is preferable that the peripheral adhesive coverage is 10% or more. Peripheral adhesive coverages exceeding 30% tends to cause friction among filaments within the fiber bundle to deteriorate fatigue characteristics, and tends to deteriorate processability in the subsequent fabrication. A more preferred proportion of the peripheral adhesive coverage is from 15 to 25%.

In order to achieve ensured penetration of the adhesive into the inside of the carbon fiber bundle and to increase adhesion between the carbon fibers and the adhesive, the carbon fibers are coated with at least one metal selected from copper, nickel, zinc, and cobalt by electrode position, and the adhesive is applied to the carbon fiber bundle. The application of the adhesive may be conducted in the same manner as described above, however, it is preferable to apply the adhesive also by electrode position. The amount of the adhesive applied to the bundle is at least 10% by weight based on the carbon fiber having the metal. It is preferable that the amount is not more than 30% by weight and more preferable from 15 to 25% by weight. When the amount is less than 10% by weight, adhesion between carbon fiber and a rubber is not sufficient. On the other hand, when the amount exceeds 30% by weight, the resulting cord tends to become hard, to reduce processability.

The electrode position of the above-described metal can be carried out by passing a direct current in an electrolyte containing the metal ion with the carbon fiber bundle immersed therein being used as a cathode. In an electrolytic bath containing the electrolyte, carbon or other insoluble metal is used as an anode, and an aqueous solution of a salt of the metal to be deposited is used as the electrolyte. Alternatively, the metal to be deposited is used as an anode, and an aqueous solution of an acid, e.g., sulfuric acid, hydrochloric acid, etc., or an aqueous solution of a salt of the metal to be deposited is used as an electrolyte.

Water-soluble salts of the metal to be deposited include a sulfate, a hydrochloride, a nitrate, and an ammonium complex salt.

According to this embodiment, application of the adhesive can be carried out by passing electricity through an aqueous solution containing the adhesive. The adhesive may be contained in either the above-described electrolyte or a separate bath. In the latter case, application of the adhesive onto the carbon fiber having a metal deposit can be carried out by passing a direct current through the bath using the carbon fiber bundle as an anode or a cathode, preferably as an anode. In the following description, the former method using a single bath and the latter method using two baths will be referred to as the "mono-bath system" and the "two-bath system", respectively.

In the case of the mono-bath system, the electrolyte to be used contains the metal salt at a concentration of from 1 to 100 g per liter and the adhesive at a concentration of from 10 to 300 g (total weight of materials in water) per liter. The carbon fiber bundle is immersed in the bath at a temperature of from 5 to 50° C., and electricity is applied at a voltage of not less than 1 V, and preferably from 10 to 15 V, and a current density of preferably from 0.001 to 5 A/m$^2$ for a period of from 1 to 80 seconds. A more preferred current density is from 0.01 to 1 A/m$^2$ from the standpoint of prevention of the adhesive from hardening. The electric voltage and current density to be used are usually varied depending on the electrical resistance of the carbon fiber bundle or the bath, the amount of the metal to be deposited, and the amount of the adhesive to be coated.

The amount of the metal is from 0.5 to 15% by weight and preferably from 1 to 12% by weight.

The immersion and processing of the carbon fiber can be carried out by means of rollers either in a batch system or in a continuous system. The continuous system is preferred in order to ensure penetration into the inside of the fiber bundle and to achieve efficient treatment. It is desirable for enhancing penetrability into the inside of the fiber bundle that an electric current be passed between the carbon fiber and the bath with a high efficiency. To this effect, it is preferable to use an apparatus that is designed so as to allow the passage of the current only between the bath and the fiber bundle.

Figure 2:
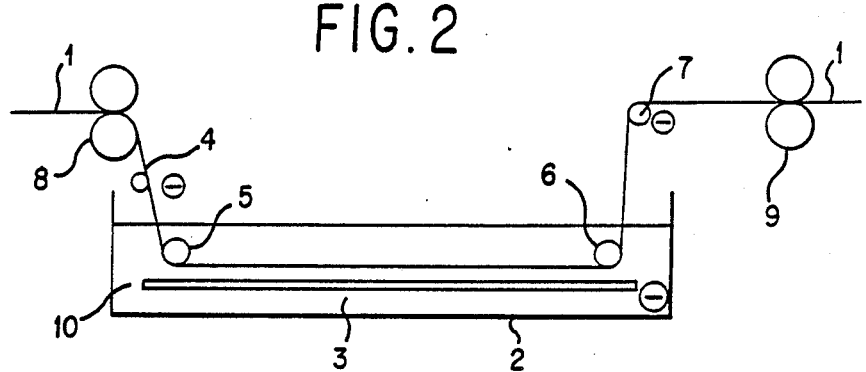
FIG. 2 is a schematic view of an apparatus used for electrode position in a mono-bath system according to the present invention.

FIG. 2 is a schematic view of an example of an apparatus which can be used for carrying out the mono-bath system. In FIG. 2, the numerals 1, 2, and 3 indicate a carbon fiber bundle, an electrically insulated container, and an electrode, respectively. The electrode is made of a metal, e.g., copper, nickel, zinc, cobalt, or carbon and has a shape of plate, rod, net, etc. The numerals 4, 5, 6, and 7 indicate rollers. Each of rollers 4 and 7 is a rotary electrode for application of electricity and is made of an electroconductive material, e.g., metals, carbon, etc. Rollers 5 and 6 are electrically insulated rotary guide rollers. The numerals 8 and 9 indicate feed rollers and feed-off rollers, respectively. The numeral 10 indicates an aqueous dispersion containing the metal ion to be deposited and the adhesive.

In the case where the two-bath system is adopted for application of the metal and the adhesive, the electrode position in the first bath can be carried out in an electrolyte containing a salt of the metal to be deposited at a concentration of from 1 to 100 g per liter at a temperature of from 5° to 50° C. for a period of from 1 to 40 seconds at a voltage of at least 1 V, and preferably from 10 to 15 V, and at a current density of from 0.1 to 5 A/m$^2$, while using the carbon fiber as a cathode and the bath as an anode.

The same apparatus as employed in the mono-bath system may be used for each of the two baths of the two-bath system. In carrying out the electrode position of the metal, it is desirable to select the electric voltage and current density so as to achieve uniform coating on the carbon fiber as in the case of the mono-bath system.

The carbon fiber having the electrodeposit is then passed through the second bath containing an aqueous dispersion of the adhesive at a solids concentration of from 10 to 300 g/liter at a temperature of from 5° to 50° C. for a period of from 1 to 80 seconds while passing electricity at a voltage of at least 1 V, and preferably from 5 to 15 V, and at a current density of from 0.01 to 10 A/m$^2$, and preferably from 0.05 to 5 A/m$^2$, using the metal-deposited carbon fiber as an anode and metal or carbon as a cathode. Application of electricity in the second bath is preferably at a low current density to prevent hardening of the adhesive.

Figure 3:
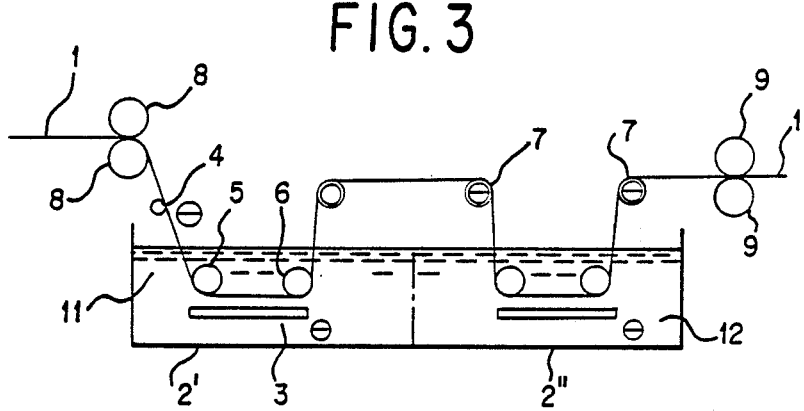
FIG. 3 is a schematic view of an apparatus used for electrode position in a two-bath system according to the present invention.

FIG. 3 is a schematic view of an example of an apparatus which can be used for carrying out the two-bath system of the invention. In FIG. 3, the numerals 11 and 12 indicate a solution of a salt of the metal to be deposited and an aqueous dispersion of the adhesive, respectively, with other numerals having the same meanings as used in FIG. 2.

In either of the mono-bath system and the two-bath system, the tension of the carbon fiber bundle should be such that the fiber bundle may not be slackened and usually ranges from 10 to 100 mg/d.

It is preferable that the metal be deposited so as to cover also the individual filaments inside the fiber bundle. In the case of use of the two-bath system, the thickness of the metal layer of the individual single fiber preferably ranges from 0.01 to 1 μm.

In the case of the mono-bath system, there is a tendency that the metal preferentially adheres to the carbon fibers over the adhesive. The composition of the bath should be controlled by tracing the proportion of the metal and the adhesive adhered. In the case of the mono-bath system, the metal compound also deposits onto the fibers with the adhesive. In both cases, the metal and the metal component in the compound in the thus treated carbon fiber bundle preferably ranges from 0.1 to 10% by weight based on the weight of the thus obtained carbon fibers.

The resulting carbon fiber bundle having deposited thereon the metal and the adhesive is then usually subjected to drying to remove water at such a temperature that does not cause reaction or decomposition of the coated materials. The conditions for drying are the same as described before for drying the bundle after application of the adhesive.

According to the above-described process wherein electrode position of the metal is applied, the fine particles of the adhesive and metal ions are attracted to the carbon fiber by application of electricity and penetrated deep into the inside of the fiber bundle. As a result, not only are the individual filaments inside the bundle sufficiently coated, but also the entire bundle can be uniformly coated. In the resulting carbon fiber bundle, the carbon fibers and the adhesive are firmly adhered via the metal, and, at the same time, the adhesion between the adhesive and rubber can be increased. In particular, when the mono-bath system, in which both the metal salt and the adhesive are present in the same dispersion, the adhesive can be adhered to the fiber bundle more effectively due to the increased electric current density. In addition, the metal is selectively and preferentially adhered to the surface of the carbon fiber to form a metal to metal-rich coating layer on the surface and near the surface of the carbon fiber while forming an adhesive-rich to adhesive layer thereareound, thereby ensuring adhesion to rubber.

The carbon fiber cord according to the present invention is useful as a reinforcing material for commonly employed rubbers, such as natural rubber and synthetic rubbers, e.g., styrene-butadiene rubber, isoprene rubber, isobutylene isoprene rubber, nitrile-butadiene rubber, etc.

The rubber latex to be used in the adhesive is appropriately selected according to the kind of rubber to which the cord is applied. For example, a nitrile-butadiene rubber latex is used for nitrile-butadiene rubber; and for other rubbers a natural rubber latex, a styrene-butadiene rubber latex, a vinylpyridine-styrene-butadiene rubber latex, etc., can be used suitably.

The above-described rubber to which the cord is applied may contain various additives, such as carbon black, sulfur, a vulcanization accelerator, an antioxidant, zinc oxide, stearic acid, a process oil, and the like.

The cord according to the present invention can be used for reinforcement of rubber in a conventional manner. For example, the cord or the cord in the form of a woven fabric may be sandwiched between two sheets composed of a rubber composition containing the above enumerated additives, followed by heating under pressure to effect vulcanization simultaneously with molding.

Use of the cord according to the present invention makes it possible to produce rubber products having high durability because of the excellent adhesion of the cord to rubber.

This invention is now illustrated in greater detail with reference to the following examples, but it should be understood that these examples are not intended to limit the present invention. In these examples, all the parts and percents are by weight unless otherwise indicated.

EXAMPLE 1

A compound of formula (I) wherein A is a polyoxyethylene group and l is 25 (hereinafter referred to as Compound (1)) and Epikote 828 (bisphenol A type epoxy resin produced by Shell International Chemicals Corp.; epoxy equivalent: 180–200) were mixed at a weight mixing ratio as shown in Table 1. The mixture was melted at 60° C, and water was poured thereinto at a rate of 10 ml/min while stirring at 5,000 rpm to prepare an aqueous dispersion having a solids content of 60% as a master liquid. The master liquid was diluted with water to have a solid content of 15 g/liter. A carbon fiber bundle of 3,600 denier (tensile strength 350 kgf/mm$^2$; modulus of elasticity: $24 \times 10^3$ kgf/mm$^2$) composed of 6,000 filaments each having a diameter of 7 μm was coated with the aqueous dispersion to a solid coverage of 0.4% by continuous dipping, followed by drying at 110° C. The resulting carbon fiber bundle was then continuously dipped in a bath containing RFL which is the reaction product obtained by reacting the following components, at a concentration of 25% (content of materials in water) at 25° C., dried at 85° C. for 2 minutes, and then heat-treated at 210° C. for 2 minutes.

RFL Composition:

| (i) Soft water | 387.6 parts |
| (ii) Sodium hydroxide (10% aqueous solution) | 6.3 parts |
| (iii) Resorcin | 23.1 parts |
| (iv) Formalin (37% formaldehyde solution) | 25.6 parts |
| (v) Nipol 2518FS (solids content: 40%) (vinylpyridine-styrene-butadiene copolymer latex produced by Nippon Zeon Co., Ltd.) | 543.5 parts |
| (vi) Aqueous ammonia (28%) | 13.9 parts |
| Total: | 1000.0 parts |

The reaction product was obtained by mixing components (i), (ii), (iii), and (iv) and the mixture was stirred at 25° C. for 6 hours. Components (v) and (vi) were added to the reaction mixture, and the thus obtained mixture was allowed to stad at the room temperature for 20 hours.

The resulting RFL-coated carbon fiber bundle was determined for the proportion of the RFL coverage to the peripheral portion of the bundle to the total RFL coverage, and the results obtained are shown in Table 1.

The resulting carbon fiber cord was twisted and evaluated for two-ply peel strength, flexing fatigue resistance, and drawing strength in accordance with the following test methods. The results obtained are shown in Table 2. Table 2 clearly shows superiority of the carbon fiber cord according to the present invention (that is, Compound (1) was used in an amount within the range of the present invention) in adhesion and fatigue resistance.

Drawing Test:(JIS L-1017)

An carbon fiber cord was embedded in a length of 8 mm in an unvulcanized rubber compound having the following composition, and the rubber was vulcanized at 150° C. under a pressure of 30 kg/cm$^2$ for 30 minutes. The force required for drawing the cord from the vulcanized rubber was measured.

Rubber Compounding:

| Natural rubber RSS#3 | 100 parts |
| Zinc oxide | 5 parts |
| Stearic acid | 2 parts |
| Carbon black (GPF) | 50 parts |
| Antioxidant (Santoflex 13 produced by Mitsubishi Monsanto Chemical Co., Ltd.; N—(1,3-dimethylbutyl)-N'—phenyl-paraphenylenediamine) | 1 part |
| Aromatic oil | 7 parts |
| Sulfur | 2.25 parts |
| Vulcanization accelerator DM (dibenzothiazolyl disulfide) | 1 part |

Two-Ply Peel Test:

Twenty cords were placed on an unvulcanized rubber sheet having the same composition as used above (width: 25 mm; length: 200 mm; thickness: 1.0 mm) in parallel to the lengthwise direction of the sheet. Another unvulcanized rubber sheet of the same composition was piled thereon, and 20 cords were aligned on this sheet in the same manner as above. Finally, a rubber sheet of the same composition was placed thereon to build up a so-called two-ply structure of rubber/cord/rubber/cord/rubber. After the structure was heated at 150° C. under a pressure of 30 kg/cm$^2$ for 30 minutes to effect vulcanization, two cord layers were peeled apart in the lengthwise direction to evaluate adhesion of the cord to rubber. FIG. 1 illustrates the two-ply structure used in this test. In FIG. 1, symbols a and b indicate a rubber layer and a cord layer, respectively.

Figure 4:
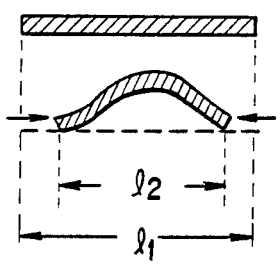
FIG. 4 is a schematic view to show the length of a rubber block before flexing ($l_1$) in a flexing fatigue test and the distance of ends of the block upon flexing ($l_2$).

Flexing Fatigue Test:

Three cords were inserted between two unvulcanized rubber sheet (width: 25.4 mm; length: 76.2 mm; thickness: 3.2 mm) having the same composition as described above in the lengthwise direction of the sheet at 6.35 mm intervals. The rubber sheets having the cords embedded therein were vulcanized at a temperature of 150° C. under a pressure of 30 kg/cm$^2$ for 30 minutes to prepare a rubber block. The rubber block was fitted to a de Mattia type flex fatigue test machine, and the rubber block was subjected to 100,000 flexes with a stroke of 30 mm (30 mm $=l_1-l_2$ in FIG. 4). The rubber block was cut into three equal parts, in the direction parallel to the cords as shown by doted lines in FIG. 1 and the rubber block having the cord was pulled at a rate of pulling of 300 mm/min at a distance of 30 mm between chucks to measure the tensile strength after the flexing fatigue. A percentage of the tensile strength after the flexing fatigue to that before the test was obtained to evaluate flexing resistance of the cord.(distance between chucks: gauge length).

TABLE 1

| | Run No. | | | | |
|---|---|---|---|---|---|
| | 1 | 2 | 3 | 4 | 5 |
| Epoxy Resin Composition: | | | | | |
| Compound (1) (%) | 3* | 7 | 14 | 18 | 25* |
| Epoxy Resin (%) | 97 | 93 | 86 | 82 | 75 |

TABLE 1-continued

| | Run No. | | | | |
|---|---|---|---|---|---|
| | 1 | 2 | 3 | 4 | 5 |
| Coverage (%) RFL (solid basis): | 0.4 | 0.4 | 0.4 | 0.4 | 0.4 |
| Total Coverage (%) | 20 | 21 | 21 | 20 | 21 |
| Proportion of Peripheral Coverage (%) | 45 | 23 | 23 | 24 | 25 |

Numbers with an asterisk (*) in Table 1 and hereinafter indicates that it is outside the scope of the present invention.

TABLE 2

| | Run No. | | | | |
|---|---|---|---|---|---|
| | 1 | 2 | 3 | 4 | 5 |
| Two-Ply Peel Strength (kg/25 mm) | 23.0 (80) | 25.4 (90) | 23.5 (85) | 22.5 (80) | 15.3 (45) |
| Drawing Strength (kg/8 mm) | 17.6 | 18.3 | 17.8 | 17.8 | 12.0 |
| Flexing Fatigue Strength Retention (%) | 55 | 80 | 85 | 84 | 73 |

Note: The values in the parentheses show the breakage of the peeled face. 100 means 100% rubber breakage, indicative of the best result, and 0 means breakage of the adhesive layer indicative of the worst result.

EXAMPLE 2

The procedure of Example 1 was repeated except for replacing Compound (1) by a compound of formula (I) wherein A is a polyoxyethylene group and n is 10, 20, or 70 to prepare a carbon fiber cord having an RFL coverage of 20% with a proportion of the peripheral RFL coverage being 24%. Each of the resulting cords was evaluated in the same manner as described in Example 1. The results obtained are shown in Table 3 below. It can be seen from Table 3 that the cords according to the present invention (that is, n is within the range of from 18 to 50) exhibit excellent adhesion to rubber and fatigue resistance.

TABLE 3

| | Run No. | | |
|---|---|---|---|
| | 1 | 2 | 3 |
| l in formula (I) | 10* | 20 | 70* |
| Two-Ply Peel Strength (kg/25 mm) | 25.0 (90) | 24.0 (85) | 16.4 (50) |
| Drawing Strength (kg/8 mm) | 17.0 | 18.2 | 13.1 |
| Flexing Fatigue Strength Retention (%) | 70 | 83 | 68 |

EXAMPLE 3

The procedure of Example 1, Run No. 3 was repeated except that the coverage of the epoxy resin composition was changed to 0.05%, 0.5%, and 1.3%, respectively, to prepare carbon fiber cords having an RFL coverage of 21% with the proportion of the peripheral RFL coverage being 23%.

Separately, the procedure of Example 1, Run No. 3 was repeated except that the coverage of the epoxy resin composition was changed to 0.5% to prepare a carbon fiber cord having an RFL coverage of 8% or 35% with the proportion of the peripheral RFL coverage being adjusted to 18% and 24%, respectively, by means of a second RFL treatment using an RFL bath having the same composition as used in Example 1, Run No. 3 but with its concentration being changed to 13%. Each of the resulting carbon fiber cords was evaluated in the same manner as in Example 1 to obtain the results as shown in Table 4 below. As is apparent from Table 4, the cord according to the present invention shows superior performances over the comparative samples.

TABLE 4

| | Run No. | | | | |
|---|---|---|---|---|---|
| | 1 | 2 | 3 | 4 | 5 |
| Epoxy Resin Composition Coverage (%) | 0.5 | 0.05* | 1.3* | 0.5 | 0.5 |
| Total RFL Coverage (%) | 21 | 21 | 21 | 8* | 35* |
| Proportion of Peripheral RFL Coverage (%) | 23 | 23 | 23 | 18 | 24 |
| Two-Ply Peel Strength (kg/25 mm) | 24.0 (85) | 18.3 (65) | 22.4 (75) | 10.5 (30) | 25.5 (90) |
| Drawing Strength (kg/8 mm) | 18.4 | 14.8 | 17.0 | 10.0 | 18.8 |
| Flexing Fatigue Strength Retention (%) | 80 | 72 | 66 | 45 | 63 |

EXAMPLE 4

The procedure of Example 1, Run No. 4 was repeated to prepare two carbon fiber cords having a total RFL coverage of 22%. The proportion of the peripheral RFL coverage was 7% in one of the two samples, while that of the other sample was increased to 38% by conducting the second RFL treatment with an RFL bath having the same composition as used in Example 1, but with its concentration being changed to 20%. Each of the resulting cords was evaluated in the same manner as in Example 1 to obtain the results as shown in Table 5 below. It can be seen from Table 5 that the sample of Example 1, Run No. 4 is superior to those of Run Nos. 1 and 2 of this Example.

TABLE 5

| | Run No. | |
|---|---|---|
| | 1 | 2 |
| Total RFL Coverage (%) | 22 | 22 |
| Proportion of Peripheral RFL Coverage (%) | 7 | 38 |
| Two-Ply Peel Strength (kg/25 mm) | 20.0 (70) | 22.0 (73) |
| Drawing Strength (kg/8 mm) | 15.8 | 18.3 |
| Flexing Fatigue Strength Retention (%) | 79 | 70 |

EXAMPLE 5

A polyurethane-modified epoxy resin represented by the formula

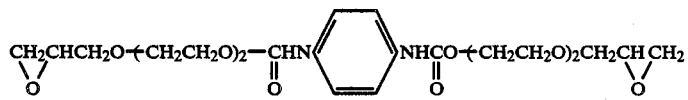

was dissolved in acetone to prepare a solution having a solids content of from 5 to 18 g per liter. The same carbon fiber bundle as used in Example 1 was coated with the solution to a solid coverage as shown in Table 6 by continuously dipping the fiber bundle in the solution, followed by drying at 60° C. Each of the thus treated carbon fiber bundles was determined for the rate of falling-off of the epoxy resin according to the method hereinbefore described. The results obtained are shown in Table 6.

Then, the carbon fiber bundle was coated with RFL by continuously dipping in an RFL bath having the same composition as used in Example 1 at 25° C., followed by drying at 85° C. for 2 minutes. The dried carbon fiber bundle was further subjected to heat treatment at 210° C. for 2 minutes. Each of the resulting cords was evaluated in the same manner as in Example 1. The results obtained are shown in Table 6. As is apparent from Table 6, the cords according to the present invention are superior in adhesion to rubber and fatigue resistance.

TABLE 6

| | Run No. | | | |
|---|---|---|---|---|
| | 1 | 2 | 3 | 4 |
| Epoxy Resin Coverage (%) | 0.05* | 0.15 | 0.40 | 0.63 |
| Two-Ply Peel Strength (kg/25 mm) | 10.5 (35) | 23.4 (85) | 25.9 (90) | 22.5 (75) |
| Drawing Strength (kg/8 mm) | 8.7 | 17.0 | 18.0 | 14.9 |
| Flexing Fatigue Strength Retention (%) | 43 | 80 | 84 | 63 |

EXAMPLE 6

A polyurethane-modified epoxy resin represented by the formula

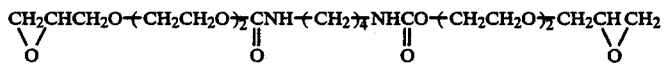

was mixed with styrylmethylphenol polyoxyethylene adduct (n=20) having an HLB of 16 at a varying mixing ratio so as to result in a variation of falling-off rate as shown in Table 7. The mixture was emulsified in water by stirring in a homogenizer at 60° C. and 5,000 rpm to prepare 60% aqueous dispersion, which was then diluted with water to concentration of 18 g/liter. A carbon fiber bundle of 1,800 denier (tensile strength: 370 kgf/mm$^2$; modulus of elasticity: 24.5×10$^3$ kgf/mm$^2$) composed of 3,000 filaments each having a diameter of 7 μm was treated with the above-prepared aqueous dispersion and then with RFL in the same manner as in Example 5 except that the coverage of the epoxy resin composition was changed to 0.4%.

Each of the resulting carbon fiber cords was evaluated in the same manner as in Example 1, and the results obtained are shown in Table 7. According to Table 7, when the rate of falling-off ranges from 0.01 to 0.2%, adhesion to rubber and fatigue resistance become particularly excellent.

TABLE 7

| | Run No. | | |
|---|---|---|---|
| | 1 | 2 | 3 |
| Epoxy Resin Composition: | | | |
| Polyurethane-Modified Epoxy Resin (%) | 95 | 85 | 75 |
| Styrylmethylphenol Polyoxyethylene Adduct (%) | 5 | 15 | 25 |
| Coverage of Epoxy Resin Composition (%) | 0.6 | 0.6 | 0.6 |
| Rate of Falling-Off (%) | 0.0012* | 0.18 | 0.42* |
| Two-Ply Peel Strength (kg/25 mm) | 18.5 (65) | 25.0 (87) | 19.2 (70) |
| Drawing Strength | 14.5 | 17.0 | 15.3 |

TABLE 7-continued

| | Run No. | | |
|---|---|---|---|
| | 1 | 2 | 3 |
| (kg/8 mm) | | | |
| Flexing Fatigue Strength Retention (%) | 68 | 84 | 76 |

EXAMPLE 7

Polybutadiene epoxy resin having an epoxy equivalent of 1,400 was dissolved in methyl ethyl ketone to prepare a solution having a concentration of from 2 to g/liter. A carbon fiber bundle of 3,600 denier composed of 6,000 filaments each having a diameter of 7 μm (tensile strength: 380 kgf/mm$^2$; tensile modulus of elasticity: 24×10$^3$ kgf/mm$^2$; Besfite HTA produced by Toho Rayon Co., Ltd.) was continuously dipped in the solution to obtain a coverage of the epoxy resin as shown in Table 8, followed by drying at 60° C. The resulting carbon fiber bundle was continuously dipped in an RFL bath having the same composition as used in Example 1 with its concentration being changed to 20%, at a temperature of 25° C. to obtain an RFL coverage as shown in Table 8, followed by drying at 85° C. for 2 minutes. The dried fiber bundle was then subjected to heat treatment at 215° C. for 2 minutes.

Each of the resulting carbon fiber cords was evaluated in the same manner as in Example 1. The results obtained are shown in Table 8. It can be seen from Table 8 that the cords according to the present invention exhibit excellent adhesion to rubber and fatigue resistance.

TABLE 8

| | Run No. | | | |
|---|---|---|---|---|
| | 1 | 2 | 3 | 4 |
| Polybutadiene Coverage (%) | 0.05* | 0.13 | 0.80 | 1.50* |
| RFL Coverage (%) | 18 | 17 | 17 | 16 |
| Two-Ply Peel Strength (kg/25 mm) | 10.5 (35) | 24.8 (83) | 26.1 (93) | 21.2 (74) |
| Drawing Strength (kg/8 mm) | 8.3 | 17.0 | 18.3 | 14.1 |
| Flexing Fatigue Strength Retention (%) | 40 | 82 | 85 | 52 |

EXAMPLE 8

A carbon fiber bundle of 1,800 denier composed of 3,000 filaments each having a diameter of 7 m (tensile strength: 390 kgf/mm$^2$; tensile modulus of elasticity: 23.9 ×10$^3$ kgf/mm$^2$; Besfite HTA produced by Toho Rayon Co., Ltd.) was dip-coated with a 11 g/liter methyl ethyl ketone solution of polybutadiene epoxy resin having an epoxy equivalent of 800, 1,500, or 2,800, and the polybutadiene-coated fiber bundle was then dip-coated with RFL to a coverage of 17% in the same manner as in Example 7.

The resulting cords were intertwined to form a twine with 10 Z-twists/10cm being in the lower side and 10 S-twists/10cm being in the upper side. The resulting twisted cord was evaluated in the same manner as in Example 1, and the results obtained are shown in Table 9 below. As can be seen from Table 9, the cord according to the present invention exhibits excellent adhesion to rubber and fatigue resistance, whereas the cord prepared by using polybutadiene epoxy resin having an epoxy equivalent of 800 was very hard, and that of an epoxy equivalent of 2,800 showed inferiority in adhesion to rubber, though having softness.

TABLE 9

|  | Run No. | | |
| --- | --- | --- | --- |
|  | 1 | 2 | 3 |
| Epoxy Equivalent of Polybutadiene | 1,500 | 800* | 2,800* |
| Two-Ply Peel Strength (kg/25 mm) | 24.3 (90) | 25.1 (91) | 19.5 (67) |
| Drawing Strength (kg/8 mm) | 18.3 | 19.4 | 13.6 |
| Flexing Fatigue Strength Retention (%) | 85 | 71 | 80 |

EXAMLE 9

The same polybutadiene epoxy resin as used in Example 7 was mixed with 0.3% of 2-ethyl-4-methylimidazole, and the mixture was dissolved in methyl ethyl ketone to prepare a solution having a concentration of 8 g/liter. The same carbon fiber bundle as used in Example 7 was dipped in the solution, followed by drying at 60° C. to remove the methyl ethyl ketone to obtain a carbon fiber bundle having a coverage of 0.4%. After the fiber bundle was heat-treated in hot air at 150° C. for 3 minutes, it was treated with RFL in the same manner as in Example 7, Run No. 3, so as to have an RFL coverage of 18.3%. The thus obtained cord was found to have a drawing strength of 18.2 kg/8 mm, a two-ply peel strength of 24.8 kg/25 mm (90), and a flexing fatigue strength retention of 87% when measured in the same manner as in Example 1.

EXAMPLE 10

A carbon fiber cord was prepared in the same manner as in Example 9 except that the 2-ethyl-4-methylimidazole as used in Example 9 was replaced by 1.0% of dicyandiamide. The resulting cord was found to have a drawing strength of 18.5 kg/8 mm, a two-ply peel strength of 25.3 kg/25 mm (89), and a flexing fatigue strength retention of 88% as measured in the same manner as in Example 1, indicating its superiority in adhesion to rubber and flexing fatigue resistance.

EXAMPLE 11

Carbon fiber cords were prepared in the same manner as in Example 8, Run No. 1 except that the RFL coverage was changed to 8%, 21%, and 27%, respectively. The resulting cords were evaluated in the same manner as in Example 1 to obtain the results shown in Table 10. Table 10 shows the superiority of the cords according to the present invention.

TABLE 10

|  | Run No. | | |
| --- | --- | --- | --- |
|  | 1 | 2 | 3 |
| RFL Coverage (%) | 21 | 8* | 33* |
| Two-Ply Peel Strength (kg/25 mm) | 26.1 (91) | 18.1 (31) | 25.4 (89) |
| Drawing Strength (kg/8 mm) | 19.3 | 14.3 | 19.4 |
| Flexing Fatigue Strength Retention (%) | 83 | 63 | 52 |

EXAMPLE 12

A carbon fiber bundle obtained from acrylonitrile polymer fibers and composed of 3,000 filaments each having a diameter of 7 μm (carbon content: 95.5%; specific resistivity: $1.5 \times 10^{-3} \Omega cm$; tensil strength: 380 kgf/mm$^2$; modulus of elasticity: $24 \times 10^3$ kgf/mm$^2$) was subjected to electrode position using an apparatus shown in FIG. 2 having a length of 1 m, a width of 0.3 m, and a dipping length of the bundle of 0.3 m. The electrolyte to be used was prepared by mixing an RFL solution having the same composition as in Example 1 and an aqueous copper acetate solution so as to have an RFL concentration of 25% and a copper acetate concentration of 0.1 g/liter, 5 g/liter, 50 g/liter, or 130 g/liter. The electrode position was performed by passing electricity between the carbon fiber bundle as a cathode and a copper plate as an anode under varied conditions of voltage, current density, and treating time as shown in Table 11. The electrodeposited carbon fiber bundle was dried at 120° C. for 3 minutes and then heat-treated treated at 230° C. for 2 minutes to obtain a cord having coated thereon copper and RFL. During the treatment, the tension of the carbon fiber bundle was kept at 50 mg/d.

Each of the resulting cords was evaluated in the same manner as in Example 1. The results obtained are shown in Table 11. Table 11 shows the superiority of the cords according to the present invention in adhesion to rubber and fatigue resistance.

TABLE 11

|  | Run No. | | | |
| --- | --- | --- | --- | --- |
|  | 1 | 2 | 3 | 4 |
| Treating Conditions: | | | | |
| Voltage (V) | 5 | 5 | 5 | 5 |
| Current Density (A/m$^2$) | 0.5 | 0.9 | 1.0 | 1.1 |
| Treating Time (sec) | 5 | 5 | 5 | 5 |
| Copper Acetate Conc. (g/liter) | 0.1 | 5.0 | 50.0 | 130.0 |
| Copper Coverage (%)* | 0.01* | 0.8 | 7.3 | 15.8* |
| RFL Coverage (%) | 25 | 26 | 27 | 28 |
| Two-Ply Peel Strength (kg/25 mm) | 20.3 | 21.8 | 24.1 | 24.2 |
| Drawing Strength (kg/8 mm) | 16.2 | 18.3 | 17.0 | 15.8 |
| Flexing Fatigue Strength Retention (%) | 71 | 81 | 85 | 74 |

EXAMPLE 13

The same carbon fiber bundle as used in Example 12 Run No. 2 was subjected to electrode position using an apparatus shown in FIG. 3 comprising first and second baths each having a length of 1 m, a width of 0.3 m, and a dipping length of the bundle 0.3 m. In the first bath, the electrolyte was an aqueous copper acetate solution at a concentration shown in Table 12, and the carbon fiber bundle was used as a cathode, while using a copper plate as an anode. The second bath contained the same RFL aqueous dispersion as used in Example 12, and the carbon fiber bundle was used as a cathode while using a copper plate as an anode. The treatment was performed under conditions shown in Table 12, and the tension of the fiber bundle was kept at 50 mg/d during the treatment. The thus treated carbon fiber bundle was dried at 120° C. for 3 minutes and then heat-treated at 230° C. for 2 minutes to obtain a cord having provided thereon a copper layer and an RFL layer. Each of the resulting cords was evaluated in the same manner as in Example 1, and the results obtained are shown in Table 12. It can be seen from Table 12 that the cords within the scope of the invention exhibit excellent adhesion to rubber and fatigue resistance.

TABLE 12

| | Run No. | | | |
|---|---|---|---|---|
| | 1 | 2 | 3 | 4 |
| Treating Conditions: | | | | |
| Voltage (V): | | | | |
| First Bath | 5 | 5 | 5 | 5 |
| Second Bath | 5 | 5 | 5 | 5 |
| Current Density (A/m²): | | | | |
| First Bath | 0.9 | 1.0 | 1.0 | 1.1 |
| Second Bath | 0.5 | 0.5 | 0.5 | 0.5 |
| Treating Time (sec): | | | | |
| First Bath | 5 | 5 | 5 | 5 |
| Second Bath | 5 | 5 | 5 | 5 |
| Copper Acetate Conc. (g/liter) | 0.1 | 5.0 | 50.0 | 130.0 |
| Copper Coverage (%) | 0.03* | 1.2 | 8.5 | 16.3* |
| RFL Coverage (%) | 25 | 25 | 26 | 26 |
| Two-Ply Peel Strength (kg/25 mm) | 20.5 | 21.9 | 26.3 | 26.8 |
| Drawing Strength (kg/8 mm) | 16.5 | 18.4 | 17.3 | 16.3 |
| Flexing Fatigue Strength Retention (%) | 76.9 | 85.3 | 86.2 | 75.4 |

EXAMPLE 14

Acrylic fibers comprising 98% of acylonitrile, of methyl acrylate, and 1% of itaconic acid (3,000 filaments each having diameter of 10 μm; strength: 6.5 g/d; elongation: 15%) were air-oxidized at 250° C. for minutes under a load of 180 mg/d, followed by carbonizing in a nitrogen atmosphere at 850° C. for 3 minutes under a load of 100 mg/d to obtain a carbonaceous fiber bundle. Properties of fibers are shown in Table 13.

TABLE 13

| Bound Oxygen Content (%) | Tensile Modulus of Elasticity (kgf/mm²) | Tensile Elongation (%) | Carbon Content (%) |
|---|---|---|---|
| 6.4 | 14,000 | 1.7 | 79 |

The carbonaceous fiber bundle was treated with the same epoxy resin composition used in Example 1, Run No. 3, and dried at 180° C. for 3 minutes to obtain a carbon fiber bundle having an epoxy resin coverage of 0.8%. The fiber bundle was then continuously dipped in a 25% RFL dispersion having the same composition as in Example 1 at 25° C., dried at 85° C. for 2 minutes, and then heat-treated at 210° C. for 2 minutes.

The resulting fiber bundle had an RFL coverage of 23.5%.

The cord obtained from bundle was evaluated in the same manner as in Example 1, and the results obtained are shown in Table 14.

TABLE 14

| Two-Ply Peel Strength (kg/25 mm) | 25.5 |
|---|---|
| Drawing Strength (kg/8 mm) | 19.2 |
| Flexing Fatigue Strength Retention (%) | 87 |

While the invention has been described in detail and with reference to specific embodiments thereof, it will be apparent to one skilled in the art that various changes and modifications can be made therein without departing from the spirit and scope thereof.

What is claimed is:

1. A carbon fiber cord for rubber reinforcement, comprising (A) a bundle of carbon fibers having coated thereon from 0.1 to 1% by weight based on the weight of the carbon fibers of at least one epoxy resin composition, and (B) a phenol-formalin-rubber latex type adhesive for rubber impregnated within said carbon fiber bundle in an amount of from 10 to 30% by weight based on the weight of the carbon fiber bundle, and wherein the amount of adhesive on the peripheral portion of the cord is from 10 to 30 wt % based on the total amount of adhesive, said epoxy resin composition being selected from the group consisting of (I) a composition comprising an epoxy resin and from 5 to 20% by weight, based on the weight of the solid components in the composition, of a compound having alkylene oxide moieties represented by formula (I)

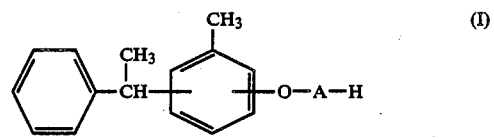

wherein A represents $-(C_2H_4O)_l-$ or $-(C_2H_4O)_m(C_3H_6O)_m-$, wherein l and n each represents an integer of from 18 to 50, m represents an integer of from 1 to 50, and n/m is from 1 to 25, (2) a composition comprising a urethane-modified epoxy resin represented by formula (II)

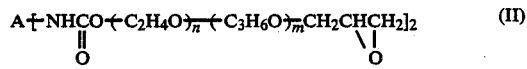

wherein A represents an aliphatic or aromatic hydrocarbon group, m and n each represents 0 or an integer of 1 or more, and the sum of n and m is from 1 to 10, and (3) a composition comprising polybutadiene epoxide resin containing a glycidyl group and having an epoxy equivalent of from 1,000 to 2,000, which is represented by formula (III)

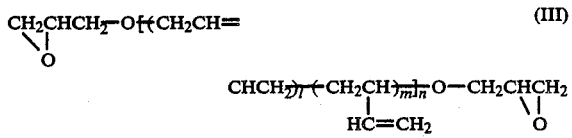

wherein n represents an integer of from 4 to 22, and l/m is from 2.3 to 9.

2. A carbon fiber cord as in claim 1, wherein said carbon fibers are derived from acrylic fibers.

3. A carbon fiber cord as in claim 1, wherein said epoxy resin used in the composition of 1 has an epoxy equivalent of from 50 to 500.

4. A carbon fiber cord as in claim 1, wherein said epoxy resin used in the composition (1) is at least one resin selected from the group consisting of bisphenol resins, phenol novolak resins, and nitrogen-containing epoxy resins.

5. A carbon fiber cord as in claim 1, wherein said composition of (1) contains a rubber latex in an amount of up to 20% by weight (solids content) based on the total weight of the solids content of the composition.

6. A carbon fiber cord as in claim 1, wherein A in formula (II) represents an alkylene group having from 1 to 6 carbon atoms, an arylene group having from 6 to 12 carbon atoms, an aralkylene group having from 6 to 12 carbon atoms, or an alkane diaryl group or aralkylene group having from 7 to 16 carbon atoms.

7. A carbon fiber cord as in claim 1, wherein said epoxy resin of formula (II) is a reaction product of an isocyanate selected from the group consisting of 2,4-tolylene diisocyanate, m-phenylene diisocyanate, p-phenylene diisocyanate, diphenylene diisocyanate, and hexamethylene diisocyanate.

8. A carbon fiber cord as in claim 1, wherein said composition of (2) has a rate of falling-off of from 0.01 to 0.2% by weight.

9. A carbon fiber cord as in claim 1, wherein said composition of (2) contains at least one other resin selected from the group consisting of bisphenol resins, phenol novolak resins, nitrogen-containing epoxy resins, polyester resins, and rubber latices in an amount of up to 20% by weight (solids content) based on the weight of epoxy resin represented by formula (II).

10. A carbon fiber cord as in claim 1, wherein said composition of (2) contains a polyoxyethylene hydrocarbon compound having an HLB of from 10 to 18 in an amount of up to 20% by weight based on the weight of epoxy resin represented by formula (II).

11. A carbon fiber cord as in claim 1, wherein said composition of (3) contains at least one polybutadiene compound of formula (III) in which terminal glycidyl ether groups are substituted with at least one group selected from the group consisting of a hydroxy group and a carboxyl ether group.

12. A carbon fiber cord as in claim 1, wherein said composition of (3) contains a catalyst for epoxy ring opening.

13. A carbon fiber cord as in claim 1, wherein said adhesive is prepared by first mixing a phenol compound with a formaldehyde to form a condensate thereof in the reaction mixture thus obtained and further mixing a rubber latex therewith.

14. A carbon fiber cord as in claim 1, wherein said phenol is a compound represented by formula (IV)

wherein a represents 1 or 2, R represents H or an alkyl group, and b represents 1 or 2.

15. A carbon fiber cord as in claim 1, wherein said phenol used in adhesive is a compound selected from the group consisting of phenol, o-cresol, m-cresol, p-cresol, 3,5-xylenol, isothimol, thimol, catechol, and resorcin.

16. A carbon fiber cord as in claim 13, wherein a part of amount of phenol is replaced with a condensate represented by formula (VI)

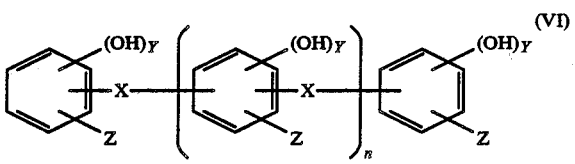

wherein x represents a methylene group, $-S_m-$ (wherein m is an integer of from 1 to 8), or an oxygen atom; Y represents 1 or 2; Z represents a hydrogen atom, a halogen atom, an alkyl group preferably having from 1 to 4 carbon atoms, an allyl group, an allyloxy group, or an alkoxy group preferably having from 1 to 4 carbon atoms; and n represents 0 or an integer of from 1 to 15.

17. A carbon fiber cord as in claim 16, wherein the condensate is used in an amount up to 70% by weight based on the total weight of phenol and the condensate.

18. A carbon fiber cord as in claim 1, wherein said latex is selected from the group consisting of a natural rubber latex, a styrene-butadiene rubber latex, a vinylpyridine-styrene-butadiene rubber latex, a nitrile rubber latex, and a chloroprene rubber latex.

* * * * *

UNITED STATES PATENT AND TRADEMARK OFFICE
CERTIFICATE OF CORRECTION

PATENT NO. : 4,891,267
DATED : January 2, 1990
INVENTOR(S) : TAKAHASHI et al.

It is certified that error appears in the above-identified patent and that said Letters Patent is hereby corrected as shown below:

On the cover page, Item [30], change "61-280984" to -- 60-280984 --; and change "61-280985" to -- 60-280985 --; and change "61-289305" to -- 60-289305 --; and change "61-289307" to -- 60-289307 --; and change "61-289308" to -- 60-289308 --.

Signed and Sealed this

Twenty-sixth Day of November, 1991

Attest:

HARRY F. MANBECK, JR.

*Attesting Officer*    *Commissioner of Patents and Trademarks*